Figure 1:
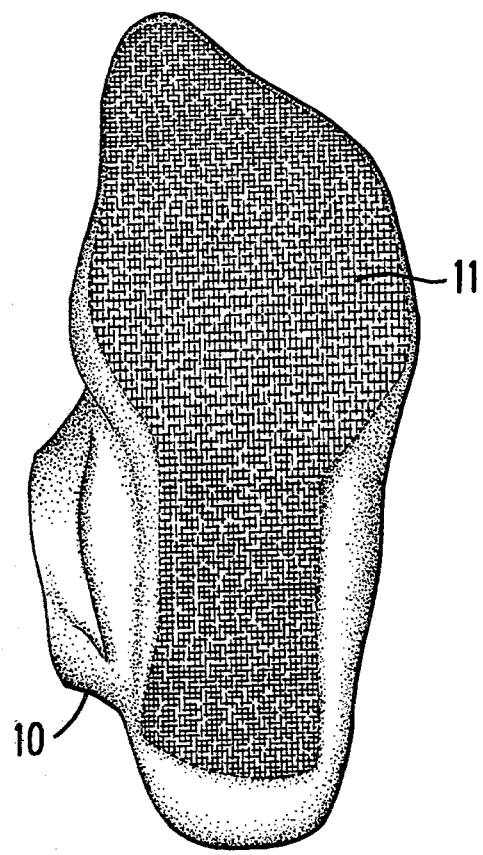

United States Patent [19]

Goldstein et al.

[11] 4,195,497
[45] Apr. 1, 1980

[54] AERATED STOCKING

[75] Inventors: Ralph Goldstein, West Hempstead, N.Y.; Ralph S. Swanson, Lenoir, N.C.

[73] Assignees: Allstate Hosiery Sales, Inc., New York, N.Y.; Connie Lee Hosiery Mills, Inc., Lenoir, N.C. ; part interest to each

[21] Appl. No.: 937,409

[22] Filed: Aug. 28, 1978

Related U.S. Application Data

[63] Continuation of Ser. No. 810,921, Jun. 29, 1977, abandoned.

[51] Int. Cl.² .......................... A41B 11/02; D04B 9/46
[52] U.S. Cl. .................... 66/185; 66/178 R; 66/180; 66/202
[58] Field of Search ............... 66/185, 187, 178, 180, 66/202

[56] References Cited

U.S. PATENT DOCUMENTS

| | | | |
|---|---|---|---|
| 2,086,820 | 7/1937 | Quinn | 66/185 |
| 2,421,473 | 6/1947 | White et al. | 66/84 X |
| 3,250,095 | 5/1966 | Bird | 66/178 |
| 3,392,552 | 7/1968 | Muller et al. | 66/169 |
| 4,057,981 | 11/1977 | Runac | 66/185 |

FOREIGN PATENT DOCUMENTS 2604 of 1889 United Kingdom ...................... 66/178

OTHER PUBLICATIONS

Wignall, Hosiery Technology, 1968, N.Y., K & D Outerwear Assoc., pp. 63–64.

*Primary Examiner*—Ronald Feldbaum
*Attorney, Agent, or Firm*—Brumbaugh, Graves, Donohue & Raymond

[57] ABSTRACT

A stocking and method of making a stocking in which an aerated region is knitted from a synthetic yarn, such as nylon, and another softer, more moisture-absorbent yarn, such as cotton, to provide a greater surface area of the synthetic material on the exterior surface than on the interior surface and a greater surface area of the other yarn on the interior surface than on the exterior surface and in which the aeration is provided by knitting air flow interstices in that region of the stocking.

9 Claims, 2 Drawing Figures

AERATED STOCKING

This application is a continuation of our co-pending application Ser. No. 810,921, filed June 29, 1977 now abandoned.

This invention relates to improvements in hosiery and, more particularly, to a novel knitted stocking in which a region thereof is made more comfortable and healthful by ventilating it and making the interior surface thereof softer and more perspiration-absorbent without detracting from the appearance of the exterior surface.

Stockings knitted from fine gauge, low moisture absorbent, high wear resistance materials, such as nylon, tend to retain perspiration on the foot and impede air flow. The build-up of perspiration in the region of the ball of the foot where the foot exerts substantial pressure causes discomfort, odor and irritation to the skin that can develop into more serious skin conditions. The present invention can be utilized to provide a stocking having a softer, more comfortable, perspiration-absorbent and aerated sole region while retaining the general texture, appearance and wear resistance of the stocking.

The aerated region of the stocking of the present invention is made from a synthetic yarn, preferably of the same general type as the stocking, for example, nylon, knitted with a softer, more absorbent yarn, such as cotton, to provide a greater area of the softer, more absorbent yarn on the interior surface of the region of the stocking than on the exterior surface thereof and a greater area of the synthetic yarn on the exterior surface than on the interior surface. The combined yarns are knitted to provide a plurality of spaced apart, enlarged loops free of crossing yarns so that these open loops define air flow interstices which afford ventilation and aeration to the aerated region of the body. The stocking is more comfortable and more beneficial to the health of the wearer than conventional nylon stockings. Furthermore, these advantages are achieved while preserving the general texture and appearance of the exterior surface of the stocking.

The novel stocking of the present invention in its preferred form is made by plating or otherwise combining nylon and cotton yarns to provide spaced apart floaters on the interior surface of the aerated region of the stocking and by periodically forming spaced apart, elongated loops free of crossing yarns. These floaters further increase the surface area of the cotton on the interior surface of the stocking while the relatively open, elongated loops provide the air flow interstices.

Figure 2:
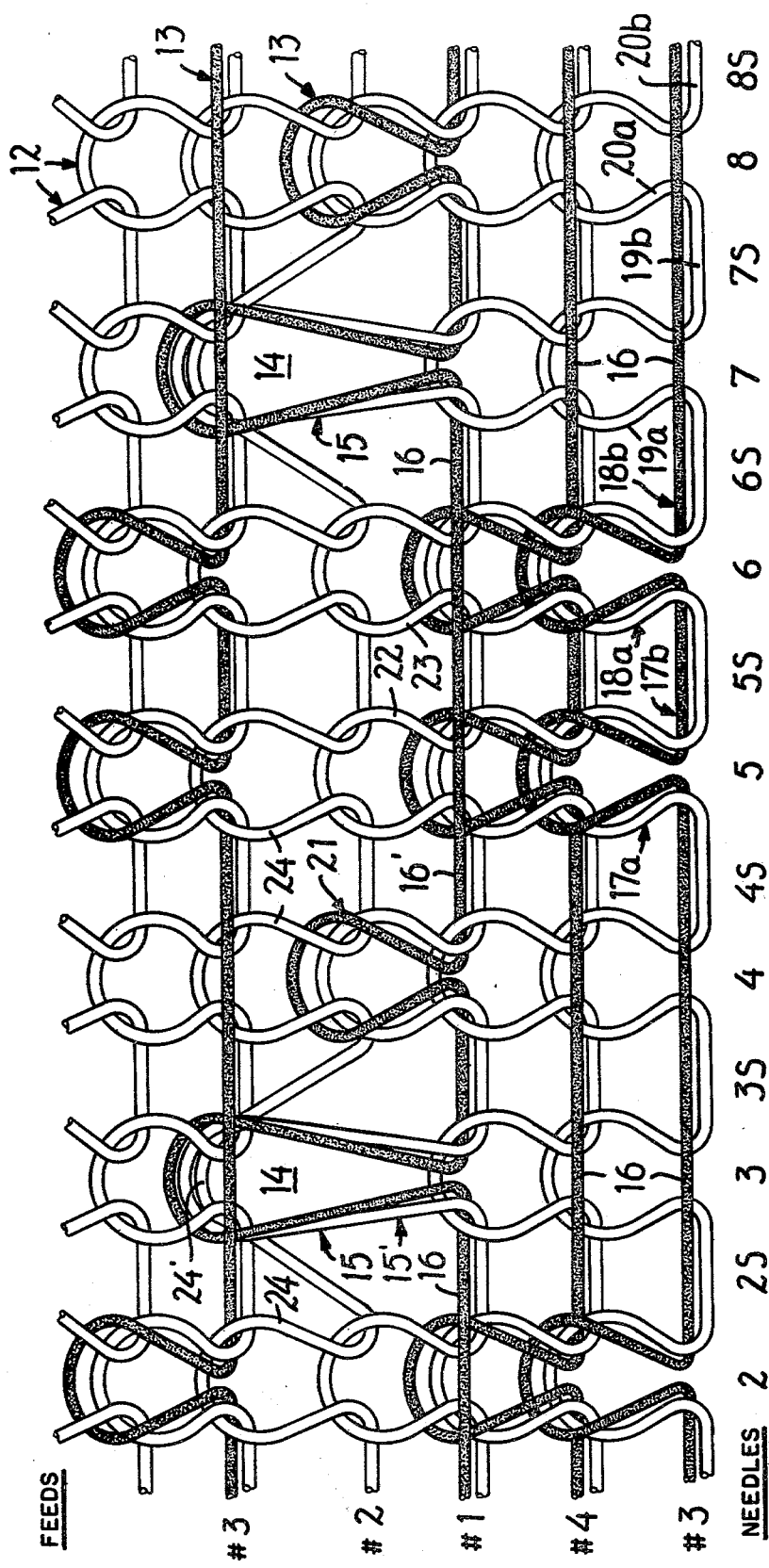

For a more complete understanding of the present invention, reference can be made to the detailed description which follows and to the accompanying drawings, in which:

FIG. 1 is a view of a stocking embodying the present invention as viewed from the sole of the wearer; and FIG. 2 is an enlarged view of a small fragment of the interior surface of the aerated region of the stocking showing the loops and sinkers of needles 2 through 8 in feeds designated #1 through 4.

A stocking embodying the present invention, as shown in FIG. 1, includes, inter alia, a leg portion 10 knitted from a synthetic material, such as nylon, and an aerated sole portion 11. The leg portion 10 of the stocking is conventional and is not described further herein. The term "stocking" as used herein is intended in the generic sense to include both full and partial length hose, full fashioned and tube hose, and pantyhouse.

The aerated region 11, as shown in FIG. 2, is made by knitting a synthetic yarn 12, preferably of the same type as is used in the leg portion 10, with a softer, moistureabsorbent yarn 13 in such a way that the exterior surface of the aerated region of the stocking contains a greater surface area of the synthetic yarn 12 than the interior surface and the interior surface of the aerated region contains a greater surface area of the other yarn 13 than the exterior surface. In the application of the present invention to ladies' hosiery the synthetic yarn can be a fine gauge 18/4 textured multifilament nylon yarn or a heavier 40 or 70 denier nylon yarn, and the softer, more moisture-absorbent yarn can be a 50 single cotton yarn. In support hosiery, Lycra or Spandex can be utilized as the synthetic yarn. The aerated sole region 11 can be of varied size and shape and can extend from toe to heel, but preferably it covers at least the region of the ball of the foot across which the greatest pressure is applied.

The desired aeration and distribution of yarns is achieved in the aerated region of the stocking by knitting the nylon and cotton yarns to produce an array of spaced apart air flow interstices 14 formed by enlarged loops 15 of the nylon and cotton yarns and an array of spaced apart cotton yarn floaters 16 on the interior surface of the sole region. The loops 15 are shown elongated in the wale direction and floaters 16 are shown extending in the course direction.

Referring to the fragment shown in FIG. 2, in the feeds #3 and #4 the nylon and cotton yarns together form a pair of needle loops and sinker loops intermediate each floater 16. For example, beginning at the fifth needle the nylon and cotton yarns together form fifth needle loops 17a, sinker loops 17b, sixth needle loops 18a and sinker loops 18b, at which point the cotton yarn is floated across the nylon while the nylon alone forms a seventh needle loop 19a, sinker loop 19b, eighth needle loop 20a and sinker loop 20b. The knitting sequence is then repeated.

In the feed designated #1 the cotton yarn floaters are offset from the cotton yarn floaters in the feeds #3 and #4 and on every fourth needle loop the cotton and nylon yarns produce an elongated loop 14 twice the length in the wale direction of the usual needle loops. More specifically, as shown in FIG. 2, following a cotton yarn float across the first two needles, a third needle elongated stitch 15' and fourth needle regular stitch 21 of the combined yarns, the cotton yarn float 16' is repeated over a series of nylon yarn stitches 22, 23, whereupon the sequence is repeated.

In the feed designated #2, the cotton yarn is eliminated and the nylon yarn forms a series of successive needle and sinker loops 24, followed by a tuck stitch 24' on every fourth needle to coincide with the upper portion of the elongated loop 15. On every fourth needle, that is to say, on the third needle and every fourth needle thereafter, the nylon in forming the tuck stitch 24', joins with the composite yarns of feed #1 in forming the upper end of the respective elongated loop, thereby insuring that the nylon yarn does not cross the air flow interstice formed by the loop. By omitting the cotton yarn from feed #2, excessive bulkiness is eliminated at the elongated stitch and the elongated loops are less inclined to close up so that the air flow interstices to tend to be more open.

By way of summary, on feed #1, needle #2, the cotton is floated and the nylon is knitted, on needle #3 both nylon and cotton yarns are double length knit and on needle #4 they are single length knit, whereupon the sequence is repeated. On feed #2, the nylon alone is tuck stitched on needle #3 and on every fourth needle thereafter and on all other needles the nylon alone is knitted. On feeds #3 and #4, the nylon is knitted on all needles, and the cotton is floated on needles #3 and #4, knitted on needles #5 and #6 and the sequence for the cotton is repeated.

The stocking of the present invention can be knit in a continuous operation on various knitting machines, such as the 406 needle, four feed circular hosiery knitting machines Mark VI and Mark IVS made by Textile Machine Works of Reading, Pa.

The invention has been shown in a single preferred form and by way of example, and obviously many variations and modifications may be made therein within the spirit of the invention. For example, although the invention has been shown and described in connection with an aerated sole region of a stocking, it may be used for other aerated regions as well, such as an aerated waist region of pantyhose. The invention, therefore, is not intended to be limited to any specified form or embodiment except in so far as such limitations are expressly set forth in the claims.

We claim:

1. An aerated stocking in which an aerated region thereof is made by knitting a synthetic yarn with another softer, more moisture-absorbent yarn to provide a greater surface area of the synthetic yarn on the exterior surface of the aerated region than on the interior surface and a greater surface area of the other yarn on the interior surface of the aerated region than on the exterior surface and comprising courses containing needle loops and sinker loops of both yarns and a plurality of spaced floaters of one yarn across needle loops and sinker loops of the other yarn and wales containing enlarged loops in the wale direction formed by both yarns in which the upper portions of the enlarged loops formed by both yarns is knit with yarn in a course beyond an adjacent course to provide an array of spaced apart airflow interstices defined by the composite yarns forming the elongated loops for increased aeration free of crossing yarns within the confines of the airflow interstices.

2. An aerated region of a stocking as set forth in claim 1 in which the synthetic yarn is nylon and the softer, more moisture-absorbent yarn is cotton.

3. An aerated region of a stocking as set forth in claim 1 including a course adjacent the course containing the yarn with which the upper ends of the composite yarns forming the elongated loops are knit and containing needle loops and sinker loops of the synthetic yarn alone and omitting the moisture-absorbent yarn, the synthetic yarn joining the composite yarns at the upper ends of the elongated loops of the adjacent course so as not to cross the airflow interstices formed by the elongated loops and so as to limit excessive bulkiness at the upper ends of the elongated loops.

4. An aerated region of a stocking as set forth in claim 1 in which the yarns forming the enlarged needle loops include a series of loops and sinker loops formed by one yarn and a series of spaced apart floaters formed by the other yarn across the first yarn, said floaters being laterally offset in the course direction from the floaters in the courses of yarns which do not form the elongated loops.

5. An aerated region of a stocking as set forth in claim 1 in which the synthetic yarn is nylon and the softer, more absorbent yarn is cotton and including a plurality of courses in which both yarns are knit to yarn of an adjacent course, and a plurality of courses in which only the nylon yarn is knit to yarn of an adjacent course, at least some of the composite yarns including a plurality of needle loops and sinker loops of both yarns followed by a plurality of needle loops and sinker loops of the nylon yarn across which the cotton yarn is floated on the interior surface, at least some of the composite yarns including spaced apart elongated loops formed by both yarns, and the nylon yarn course forming loops corresponding to the upper ends of the elongated loops formed by the composite yarns, the elongated loops defining the air flow interstices of the aerated region free of crossing yarns and the omission of the cotton yarn from the nylon loops corresponding to the upper ends of the elongated loops limiting excessive bulkiness.

6. A method of knitting a stocking in which a region thereof is aerated comprising the steps of knitting a synthetic yarn with another softer, more moisture-absorbent yarn to provide a greater surface area of the fine gauge yarn on the exterior surface of the aerated region than on the interior surface and a greater surface area of the other yarn on the interior surface of the aerated region than on the exterior surface, knitting both yarns in a series of needle loops and sinker loops, continuing to knit one yarn in a series of needle loops and sinker loops while floating the other yarn at spaced apart intervals across the needle loops and sinker loops formed by the first yarn, combining both yarns at spaced apart intervals to produce elongated loops in the wale direction and knitting the upper portions thereof with yarn in a course beyond an adjacent course to provide an array of air flow interstices for increased aeration free of crossing yarns within the confines thereof.

7. A method of knitting a stocking as set forth in claim 6 in which the synthetic yarn is nylon and the softer, more moisture-absorbent yarn is cotton.

8. A method of knitting a stocking as set forth in claim 6 including knitting only the synthetic yarn in a course adjacent the course containing the yarn with which the upper portions of the elongated loops are knit, causing the synthetic yarn to join with the combined yarns in forming the upper ends of the elongated loops so as not to cross the air flow interstices formed by the elongated loops and omitting the moisture-absorbent yarn from that course to limit excessive bulkiness at the elongated loops.

9. An aerated stocking in which an aerated region thereof on the sole of the stocking comprises a synthetic yarn knitted with another more moisture-absorbent yarn to provide a greater surface area of the synthetic yarn on the exterior surface of the aerated region than on the interior surface and a greater surface area of the more moisture-absorbent yarn on the interior surface of the aerated region than on the exterior surface, a plurality of composite yarns knitted in a series of needle loops and sinker loops of both yarns followed by a plurality of knitted needle loops and sinker loops of the synthetic yarn across which the cotton yarn is floated, at least some of the composite yarn also including spaced apart elongated loops formed by both yarns and knitted to yarn in a course beyond an adjacent course, said elongated loops defining air flow interstices, and a synthetic yarn in a course adjacent the course containing the yarn to which the upper ends of the elongated loops are knitted and joining the composite yarn to form loops with the upper ends of the elongated loops to insure that they do not cross the air flow interstices formed by the composite yarn elongated loops, the air flow interstices defined by the elongated loops of both yarns being free of crossing yarns and the omission of the moisture-absorbent yarn from the course containing the synthetic yarn eliminating excessive bulkiness at the elongated loops.

* * * * *